US012222981B2

(12) United States Patent
Gowda (10) Patent No.: US 12,222,981 B2
(45) Date of Patent: Feb. 11, 2025

(54) SYSTEMS AND METHODS FOR TEACHING CONTROL BUTTON FUNCTIONALITY TO AN OCCUPANT OF A VEHICLE

(71) Applicant: Nissan North America, Inc., Franklin, TN (US)

(72) Inventor: Nikhil Gowda, San Francisco, CA (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/459,957

(22) Filed: Aug. 27, 2021

(65) Prior Publication Data

US 2023/0069304 A1    Mar. 2, 2023

(51) Int. Cl.
*G06F 16/00*    (2019.01)
*G06F 7/00*    (2006.01)
*G06F 16/635*    (2019.01)
*G06F 16/638*    (2019.01)
*G06F 16/64*    (2019.01)

(52) U.S. Cl.
CPC .......... *G06F 16/635* (2019.01); *G06F 16/638* (2019.01); *G06F 16/64* (2019.01)

(58) Field of Classification Search
CPC ....... G06F 16/635; G06F 16/638; G06F 16/64
USPC ....................................................... 707/722
See application file for complete search history.

(56) References Cited

U.S. PATENT DOCUMENTS

| | | | |
|---|---|---|---|
| 2006/0116979 A1* | 6/2006 | Jung | G06F 16/248 |
| 2010/0286867 A1* | 11/2010 | Bergholz | B60K 37/06 |
| | | | 701/36 |
| 2016/0042664 A1* | 2/2016 | Haberl | G09B 19/167 |
| | | | 434/62 |
| 2021/0232414 A1* | 7/2021 | Maeda | G06F 40/35 |
| 2021/0375272 A1* | 12/2021 | Madwed | G06F 3/167 |
| 2022/0128373 A1* | 4/2022 | Lee | G01C 21/3617 |

* cited by examiner

*Primary Examiner* — Raquel Perez-Arroyo
(74) *Attorney, Agent, or Firm* — Global IP Counselors, LLP (57) ABSTRACT

Systems and methods for teaching control button functionality to an occupant of a vehicle are disclosed herein. In an embodiment, a system for teaching control button functionality to an occupant of a vehicle includes a plurality of adjustable vehicle components, an audio device, a plurality of control buttons, and a controller. The audio device is configured to receive an audible trigger from the occupant. The plurality of control buttons are each configured to cause an adjustment of at least one adjustable vehicle component when actuated by the occupant. The controller is programmed to (i) disable the plurality of control buttons upon reception of the audible trigger by the audio device, and (ii) upon actuation of a control button of the plurality of control buttons, cause the audio device to output an audible message relating to the at least one adjustable vehicle component configured to be adjusted by the control button.

20 Claims, 3 Drawing Sheets

SYSTEMS AND METHODS FOR TEACHING CONTROL BUTTON FUNCTIONALITY TO AN OCCUPANT OF A VEHICLE

BACKGROUND

Technical Field

The present disclosure generally relates to systems and methods for teaching control button functionality to an occupant of a vehicle. More specifically, the present disclosure relates to systems and methods for teaching control button functionality when triggered by the occupant.

Background Information

Many vehicle occupants do not know or sometimes forget the functionality of certain control buttons, even when standardized icons are displayed on the control buttons. Typically, these vehicle occupants have to look up the control button icons in the vehicle's user manual to figure out the functionality. Even then, the functionality of some control buttons may not be clear to a vehicle occupant if he or she requires more of an explanation than the user manual provides, for example, because he or she does not have a general understanding of certain vehicle components or modes to begin with.

SUMMARY

It has been discovered that it is advantageous to provide vehicle occupants with messages regarding the functionality of control buttons as the control buttons are pressed. The present disclosure therefore provides systems and methods which teach control button functionality in this manner. In an embodiment, the messages are audible messages which are triggered with an audible command from a vehicle occupant (e.g., "What does this button do?"). This provides the occupant with hands-free learning which only requires the user to press the button itself. The system recognizes the control button pressed by the occupant and provides a response without actuating the typical functionality of that control button (e.g., "This is the defroster."). If the occupant still does not understand the functionality, the system provides further detail (e.g., "The defroster is used to remove water formation on the windshield or rear window, an occurrence typical to when the outside temperature is low and the AC is off."). The messages can also go beyond cabin functions and explain more advanced functions like cruise control with lane keeping. Since many control buttons are the same in different types of vehicles (e.g., from a same manufacturer), the systems and methods discussed herein not only teach vehicle owners about the functionality of their current vehicle, but also about the functionality of all vehicles with similar functions. The systems and methods are also advantageous because they teach the vehicle owners what the buttons/functions are called so that voice activation commands are possible/simplified for future use.

In view of the state of the known technology, one aspect of the present disclosure is to provide a system for teaching control button functionality to an occupant of a vehicle. The system includes a plurality of adjustable vehicle components, an audio device, a plurality of control buttons, and a controller. The audio device is configured to receive an audible trigger from the occupant. The plurality of control buttons are each configured to cause an adjustment of at least one adjustable vehicle component of the plurality of adjustable vehicle components when actuated by the occupant. The controller is programmed to (i) disable the plurality of control buttons upon reception of the audible trigger by the audio device, and (ii) upon actuation of a control button of the plurality of control buttons, cause the audio device to output at least one audible message relating to the at least one adjustable vehicle component configured to be adjusted by the control button.

A second aspect of the present disclosure is to provide another system for teaching control button functionality to an occupant of a vehicle. The system includes a plurality of adjustable vehicle components, a plurality of control buttons, and a controller. The plurality of control buttons are each configured to be placed in at least (i) a first state in which actuation by the occupant causes an adjustment of at least one adjustable vehicle component of the plurality of adjustable vehicle components, and (ii) a second state in which actuation by the occupant causes at least one message relating to the at least one adjustable vehicle component to be output to the occupant. The controller is programmed to place the plurality of control buttons in the second state upon reception of a trigger, such that actuation of a control button of the plurality of control buttons causes output of the at least one message relating to the at least one adjustable vehicle component corresponding to the control button.

A third aspect of the present disclosure is to provide a method of teaching control button functionality to vehicle occupants. The method includes receiving a trigger from an occupant of a vehicle having a plurality of control buttons each configured to cause an adjustment of at least one adjustable vehicle component upon actuation by the occupant, adjusting a state of the plurality of control buttons upon reception of the trigger so that actuation of a control button of the plurality of control buttons causes an output of at least one message relating to the at least one adjustable vehicle component corresponding to the control button instead of causing the adjustment of the at least one adjustable vehicle component, and causing the at least one message relating to the at least one adjustable vehicle component corresponding to the control button to be output to the occupant upon actuation of the control button.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
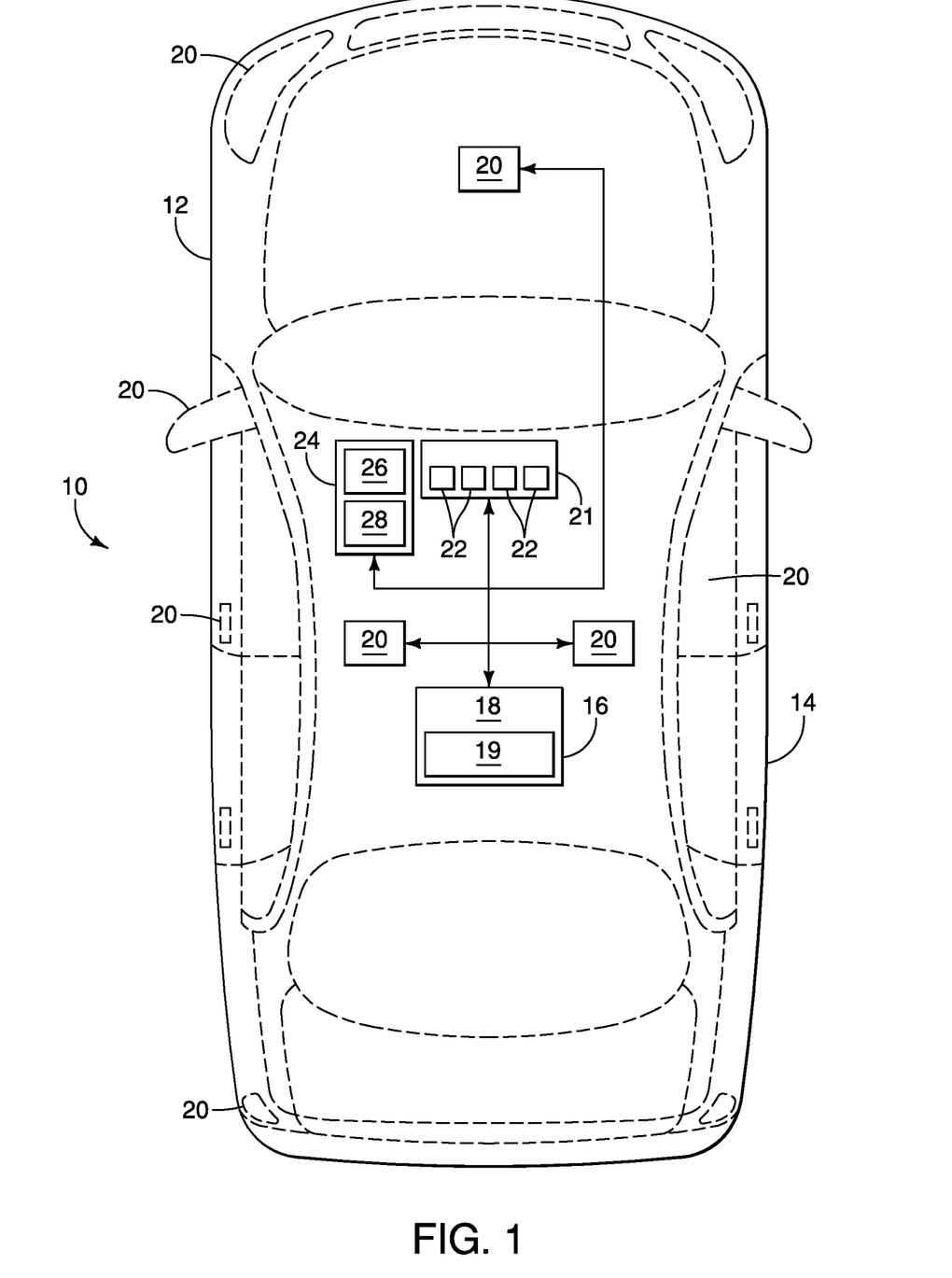
FIG. 1 illustrates a schematic diagram of an example embodiment of a system for teaching control button functionality to an occupant of a vehicle.

Referring initially to FIG. 1, a system 10 for teaching control button functionality to an occupant of a vehicle 12 is illustrated in accordance with a first embodiment. In the illustrated embodiment, the system 10 includes a vehicle 12 having a vehicle body 14 and a controller 16. Alternatively, the system 10 can include the controller 16 and/or other components discussed herein and be separate from and in communication with one or more components of the vehicle 12.

In an embodiment, the controller 16 includes at least one processor 18 and at least one memory 19. The controller 16 preferably includes a microcomputer with a vehicle component control program that controls a plurality of adjustable vehicle components 20 as discussed below. The controller 16 can also include other conventional components such as an input interface circuit, an output interface circuit, and storage devices such as a ROM (Read Only Memory) device and a RAM (Random Access Memory) device. The microcomputer of the controller 16 is programmed to control one or more vehicle component 20, control panel 21, control button 22 and/or audio device 24 discussed herein. The memory circuit stores processing results and control programs such as ones for vehicle component control operations that are run by the processor circuit. The controller 16 is operatively coupled to the vehicle body 14 in a conventional manner. The internal RAM of the controller 16 stores statuses of operational flags and various control data. The internal ROM of the controller 16 stores the instructions for various operations. The controller 16 is capable of selectively controlling any of the components of the vehicle 12 in accordance with the control program.

The vehicle 12 includes at least one adjustable vehicle component 20. More specifically, the vehicle 12 includes a plurality of adjustable vehicle components 20. An adjustable vehicle component 20 can include any vehicle component that is capable of being adjusted based on instructions from the controller 16. In FIG. 1, various adjustable vehicle components 20 are shown. For example, the plurality of illustrated adjustable vehicle components 20 include one or more of a light (e.g., headlight, taillight, break light, etc.), a turn signal, a sideview or rearview mirror, a door lock, a window, an in-cabin component (e.g., a seat, a climate control system, a navigation system, etc.), an engine component, and/or any other component. Those of ordinary skill in the art will recognize from this disclosure that these or any other adjustable vehicle components 20 can be explained and controlled in accordance with the systems and methods discussed herein.

An adjustment of an adjustable vehicle component 20 can include any adjustment triggered by the controller 16. The controller 16 is configured to trigger the adjustment by directly controlling the adjustable vehicle component 20 and/or by sending instructions to a separate controller of the adjustable vehicle component 20. An adjustment of an adjustable vehicle component 20 can include any physical, electrical and/or computer adjustment, for example, a mechanical adjustment, a volume level adjustment, a temperature adjustment, a route adjustment, a mode adjustment, or any other adjustment. The adjustment can be turn the at least one adjustable vehicle component 20 on or off. The adjustment can be to change at least one adjustable vehicle component 20 from a current configuration to a new configuration. In an embodiment, the controller 16 is programmed to adjust each of the plurality of adjustable vehicle components 20 in response to at least one audible command from the occupant (e.g., the audible command "Turn the heat up" to cause the controller 16 to adjust a climate control system).

In an embodiment, the vehicle 12 includes a control panel 21. The control panel 21 includes at least one control button 22. In the illustrated embodiment, the control panel 21 includes a plurality of control buttons 22. The control panel 21 can include, for example, the dashboard of the vehicle 12. It should be understood from this disclosure that the vehicle 12 can include multiple control panels 21 and/or can include control buttons 22 which are not part of a distinguishable control panel 21.

As illustrated in FIG. 1, the vehicle 12 includes a plurality of control buttons 22. The plurality of control buttons 22 can be a subset of the total number of control buttons 22 in the vehicle 12. The control buttons 22 can be different types and can be actuated in different ways. For example, a control button 22 can be a push button, a touch button (e.g., on a graphical user interface), a switch, a knob, or any other type of button which can be actuated (e.g., physically pressed, touched on a touch screen, or other tactile actuation) by a vehicle occupant. Each control button 22 is configured to cause an adjustment of at least one adjustable vehicle component 20 of the plurality of adjustable vehicle components 20 when actuated by the occupant. In an embodiment, each control button 22 is configured to be activated and deactivated by the controller 16. In an embodiment, each control button 22 is configured to be placed in at least a first state and a second state by the controller 16. In the first state (e.g., an active state), actuation of the control button 22 by a vehicle occupant causes an adjustment of at least one corresponding adjustable vehicle component 20 of the plurality of adjustable vehicle components 20 (e.g., causes the adjustable vehicle component 20 to change from a current configuration to a new configuration). In the second state (e.g., a disabled state), actuation by the vehicle occupant causes at least one message relating to the at least one corresponding adjustable vehicle component 20 to be output to the occupant. In the second state, actuation of the control button 22 by the vehicle occupant does not cause the adjustment of the at least one corresponding adjustable vehicle component 20 (e.g., the adjustable vehicle component 20 remains in the current configuration upon actuation of the control button 22).

In an embodiment, the vehicle 12 includes an audio device 24. The audio device 24 is configured to receive an audible trigger from a vehicle occupant. The vehicle occupant can be a driver or passenger. Specifically, the audio device 24 is configured to receive an audible command including the audible trigger. The audio device 24 is also configured to output at least one audible message relating to at least one adjustable vehicle component 20. The audio device 24 can also serve other functions within the vehicle 12, for example, can also be used by a navigation system, an in-vehicle entertainment unit, or another vehicle component. In an embodiment, the vehicle 12 includes multiple audio devices 24. The audio device 24 can also be a vehicle component 20 which is controlled by the controller 16 in accordance with the present disclosure.

The audio device 24 includes a microphone 26. The microphone 26 is configured to receive the audible trigger from the occupant of the vehicle 12. The audio device 24 also includes a speaker 28 configured to provide at least one audible message to the occupant. In an embodiment, the microphone 26 and the speaker 28 are located together on the same unit. Alternatively, the microphone 26 and the speaker 28 can be located separately. In an embodiment, the audio device 24 can include multiple microphones 26 and/or multiple speakers 28 located at different locations within the vehicle 12.

The audio device 24 is configured to generate command data based on an audible command received from an occupant. In an embodiment, the command data represents the audible command received by the audio device 24. In an embodiment, each audible command received by the audio device 24 results in the generation of distinct command data. In an embodiment, the command data includes an automatic speech recognition (ASR) output and/or a natural language understanding (NLU) output and/or is used to generate an ASR output and/or an NLU output. The controller 16 is configured to use the command data to determine whether a trigger has been received, as discussed in more detail below. Besides the trigger, the command data can also include a command from the occupant to adjust one or more adjustable vehicle component 20 (e.g., the audible command "Turn the heat up" is a direct instruction to adjust the climate control system). In an embodiment, the controller 16 is configured to process such a command using speech recognition software and cause the commanded adjustment.

Figure 2:
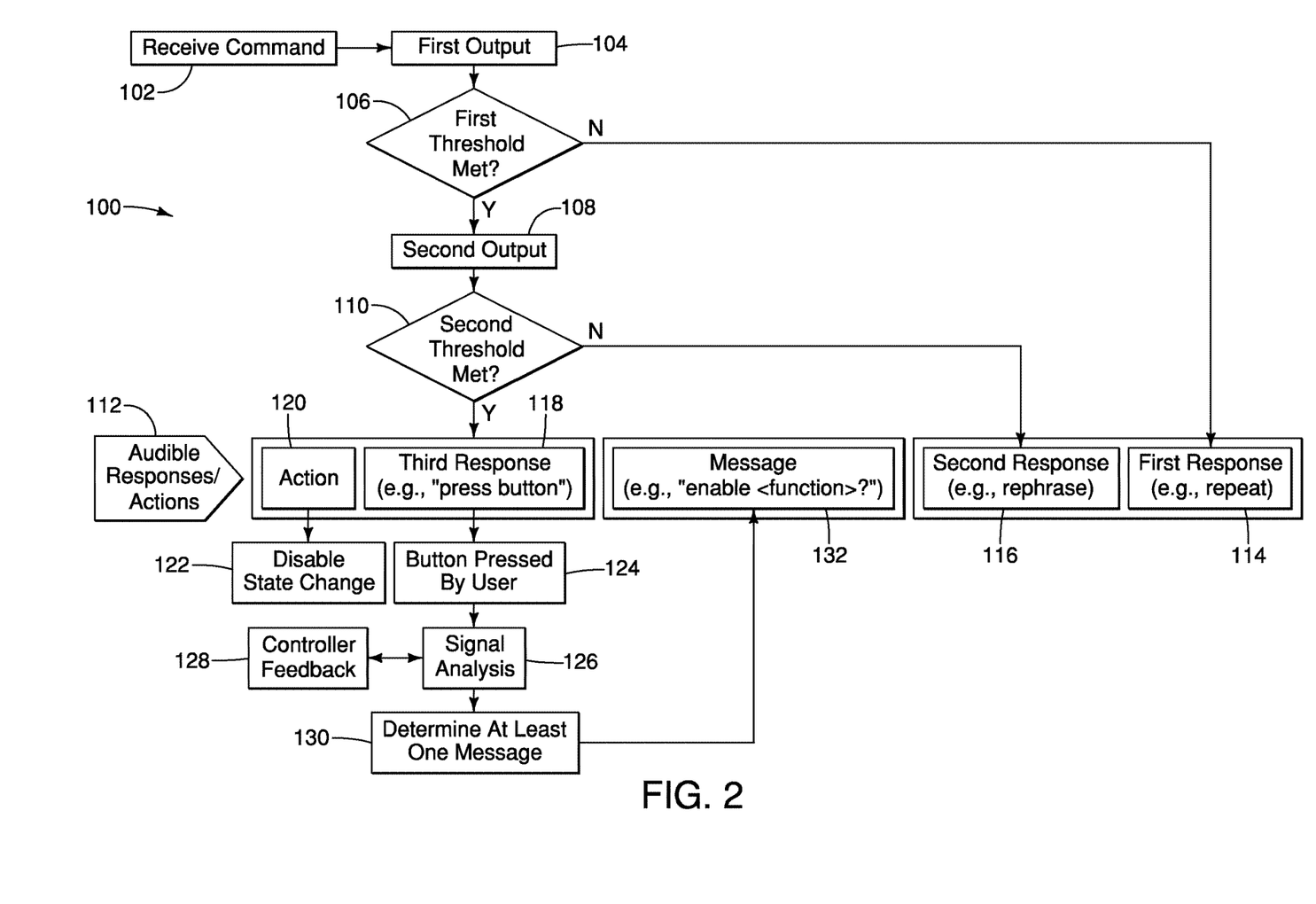
FIG. 2 illustrates an example embodiment of a method of teaching control button functionality to an occupant of a vehicle which can be implemented using the system of FIG. 1.

FIG. 2 illustrates an example embodiment of a method 100 of teaching control button functionality to an occupant of the vehicle 12. Some or all of the steps of the method 100 can be stored as instructions on at least one memory 19 of the controller 16 and executed by at least one processor 18 of the controller 16. Some or all of the steps of the method 100 can also be stored as instructions on a memory of one or more of an adjustable vehicle component 20, control panel 21, and/or audio device 24 and executed by a processor of the adjustable vehicle component 20, control panel 21, and/or audio device 24. It should be understood from this disclosure that some of the steps described herein can be reordered or omitted without departing from the spirit or scope of the method 100.

At step 102 of the method 100, the audio device 24 receives an audible command from an occupant of the vehicle. Specifically, the microphone 26 of the audio device 24 receives the audible command. The audible command can include an audible trigger. The audible trigger can include, for example, a trigger word or phrase (e.g., "What does this button do?" or "What is this button called?"). The audible command can also include an instruction from the occupant to adjust at least one adjustable vehicle component 20 (e.g., "Turn the heat up."). At one or more of steps 104, 106, 108 and 110, the controller 16 is configured to determine whether the audible command includes the audible trigger or is intended for something else such as the adjustment of a vehicle component 20. In an embodiment, the controller 16 is configured to determine whether the audible command includes the audible trigger or is intended for something else using speech recognition software. At step 102, the plurality of control buttons 22 are in an active or first state as the audible command is received.

The audio device 24 generates command data based on the audible command. In an embodiment, the command data includes the audible trigger. In an embodiment, the command data includes data sufficient to allow the controller 16 to generate at least one output corresponding to the audible command. In an embodiment, the at least one output includes a first output and a second output. In an embodiment, the command data includes data sufficient to allow the controller 16 to generate an ASR output and/or an NLU output. In an embodiment, the command data includes an ASR output and/or an NLU output. In an embodiment, the ASR output and/or an NLU output includes the trigger.

At step 104, the controller 16 processes the command data. Specifically, the controller processes a first output from the command data. In an embodiment, the controller 16 generates the first output based on the command data. In the illustrated embodiment, the first output includes an ASR output corresponding to the audible command. In an embodiment, the controller 16 determines at step 104 that the first output includes the audible trigger and skips steps 106, 108 and 110.

At step 106, the controller 16 processes the command data to determine whether a first threshold has been met. More specifically, the controller 16 determines whether the first threshold has been met by the first output. In an embodiment, the first threshold is met when the controller 16 recognizes at least one word from the first output. In an embodiment, the first threshold is met when the controller recognizes at least one word from the first output which corresponds to a predetermined group of words. In another embodiment, the first threshold is met when the controller 16 recognizes a predetermined number of a plurality of words of the first output (e.g., from a predetermined group of words). In an embodiment, the controller 16 is configured to generate at least one confidence score (e.g., a first confidence score) based on the first output. In an embodiment, the first confidence score is based on a number of recognized words in the first output. In an embodiment, the first confidence score is based on a type of recognized word in the first output. In an embodiment, the first confidence score is based on missing words in the first output. In an embodiment, the first confidence score includes a first numerical value and the first threshold includes a second numerical value, and the controller 16 is configured to determine that the first threshold has been met if the first numerical value is above or below the second numerical value. In an embodiment, the first confidence score is generated based on the controller 16 recognizing one word from the first output (e.g., from a predetermined group of words). In an embodiment, the first confidence score is generated based on the controller 16 recognizing particular words or a particular order of words from the first output. In an embodiment, the first confidence score includes an error probability determination. In an embodiment, the first threshold is met if the first confidence score is within a standard deviation of the first threshold (e.g., one standard deviation as determined by user studies). If the first output does not meet the first threshold, the method 100 proceeds to step 114. If the first output meets the first threshold, the method 100 proceeds to step 108. In an embodiment, the controller 16 determines at step 106 that the first output includes the trigger and skips steps 108 and 110 to proceed to steps 118 and 120.

At step 108, the controller 16 processes the command data. Specifically, the controller 16 generates and/or processes a second output from the command data. In the illustrated embodiment, the second output includes an NLU output corresponding to the audible command. In an embodiment, the controller 16 skips steps 104 and 106 and determines at step 108 that the command data includes the trigger, thus proceeding to steps 118 and 120.

At step 110, the controller 16 processes the command data to determine whether a second threshold has been met. More specifically, the controller 16 determines whether the second threshold has been met by the second output. In an embodiment, the second threshold is met when the controller 16 recognizes at least one word from the second output. In an embodiment, the second threshold is met when the controller 16 recognizes at least one word from the second output which corresponds to a predetermined group of words. In another embodiment, the second threshold is met when the controller 16 recognizes a predetermined number of a plurality of words of the second output (e.g., from a predetermined group of words). In an embodiment, the controller 16 is configured to generate at least one confidence score (e.g., a second confidence score) based on the second output. In an embodiment, the second confidence score is based on a number of recognized words in the second output. In an embodiment, the second confidence score is based on a type of recognized word in the second output. In an embodiment, the second confidence score is based on missing words in the second output. In an embodiment, the second confidence score includes a first numerical value and the second threshold includes a second numerical value, and the controller 16 is configured to determine that the second threshold has been met if the first numerical value is above or below the second numerical value. In an embodiment, the second confidence score is generated based on the controller 16 recognizing one word from the first output (e.g., from a predetermined group of words). In an embodiment, the second confidence score is generated based on the controller 16 recognizing particular words or a particular order of words. In an embodiment, the second confidence score includes an error probability determination. In an embodiment, the second threshold is met if the second confidence score is within a standard deviation of the second threshold (e.g., one standard deviation as determined by user studies). If the second output does not meet the second threshold, the method 100 proceeds to step 116. If the second output meets the second threshold, the method 100 proceeds to steps 118 and 120.

The steps at 112 illustrate various messages/actions which can be caused/output to the vehicle occupant during the method 100. Each of these messages/actions is discussed in more detail below. It should be understood by those of ordinary skill of art from this disclosure that the method 100 can be practiced without one or more of these messages/actions and/or with additional and/or different messages/actions.

At step 114, the controller 16 causes a first response to be output from the audio device 24. The first response requests that the audible command be repeated. For example, the first response can include an audible response from the audio device 24 to an occupant of the vehicle 12 asking for the audible command from step 102 to be repeated (e.g., "Can you repeat that?"). In the illustrated embodiment, the controller 16 causes the first response to be output from the audio device 24 after determining that the first threshold has not been met at step 106. Specifically, the controller 16 causes the first response to be output from the audio device 24 after determining that an ASR output from the command data does not meet a first confidence score threshold at step 106. This can mean that the audible command was not heard clearly by the audio device 24. The method 100 then returns to step 102 for the occupant to repeat the audible command.

At step 116, the controller 16 causes a second response to be output from the audio device 24. The second response is different from the first response. The second response requests that the audible command be rephrased. For example, the second response can an audible response from the audio device 24 to an occupant of the vehicle 12 asking for the audible command from step 102 to be rephrased (e.g., "Can you rephrase that?"). In the illustrated embodiment, the controller 16 causes the second response to be output from the audio device 24 after determining that the second threshold has not been met at step 110. Specifically, the controller 16 causes the second response to be output from the audio device 24 after determining that an NLU output from the command data does not meet a second confidence score threshold at step 110. This can mean that the controller 16 understood the words of the audible command but still did not understand the occupant's intention with the audible command. The method 100 then returns to step 102 for the occupant to rephrase the audible command.

The controller 16 initiates steps 118 and/or 120 when the system 10 has received a trigger from the occupant. Specifically, the controller 16 initiates steps 118 and/or 120 when the system 10 has received a trigger from the occupant of the vehicle 12 having a plurality of control buttons 22 each configured to cause an adjustment of at least one adjustable vehicle component 20 upon actuation by the occupant. In the illustrated embodiment, the trigger is an audio trigger. Specifically, the trigger is an audible trigger that is detected in the command data at one or more of steps 102, 104, 106, 108 and/or 110. In another embodiment, the method 100 can be practiced without an audible command and/or the trigger can be detected in other ways. For example, in an embodiment, the vehicle 12 can include a trigger button which can be actuated by the occupant to activate the trigger.

As described in more detail below, the controller 16 adjusts a state of the plurality of control buttons 22 upon reception of the trigger so that actuation of a control button 22 of the plurality of control buttons 22 causes an output of at least one message relating to the at least one adjustable vehicle component 20 corresponding to the control button 22 instead of causing the adjustment of the at least one adjustable vehicle component 20. Then, the controller 16 causes the at least one message relating to the at least one adjustable vehicle component 20 corresponding to the control button 22 to be output to the occupant upon actuation of the control button 22.

At step 118, the controller 16 causes a third response to be output from the audio device 24. The third response instructs the occupant to press a control button 22. For example, the third response can include an audible response from the audio device 24 asking the occupant to press the control button 22 which the occupant would like to learn about (e.g., "Please press the button." or "Which button are you asking about?"). In the illustrated embodiment, the controller 16 causes the third response to be output from the audio device 24 after detecting the trigger. In the illustrated embodiment, the controller 16 causes the third response to be output from the audio device 24 after determining that the first threshold has been met at step 106 and the second threshold has been met at step 110, indicating that the trigger is present in the command data. More specifically, the controller 16 causes the third response to be output from the audio device 24 after determining that an ASR output from the command data meets a first confidence score threshold for the trigger at step 106, and that an NLU output from the command data meets a second confidence score threshold for the trigger at step 110.

At step 120, the controller 16 generates an instruction for the plurality of control buttons 22 to be placed in the second (e.g., disabled) state wherein actuation by the occupant causes at least one message relating to at least one corresponding adjustable vehicle component 20 to be output to the occupant. In an embodiment, at step 120, the controller 16 generates an instruction to disable the plurality of control buttons 22 upon reception of the trigger. In an embodiment, the controller 16 generates an instruction to place the plurality of control buttons 22 in the second state upon reception of the trigger.

At step 122, the plurality of control buttons 22 are disabled or placed in the second state. In the disabled or second state, actuation of a control button 22 of the plurality of control buttons 22 by a vehicle occupant does not cause an adjustment of at least one corresponding adjustable vehicle component 20 which would normally be adjusted by actuation in the active or first state. Instead, actuation of a control button 22 of the plurality of control buttons 22 by a vehicle occupant causes output of the at least one message relating to the at least one adjustable vehicle component 20 corresponding to the control button 22, as explained in more detail below.

It should be understood from this disclosure that there can be buttons besides the plurality of control buttons 22 which are not deactivated or placed in the second state with the plurality of control buttons 22 at step 122. For example, the plurality of control buttons 22 may be a subset of the total number of control buttons 22. In another example, the plurality of control buttons 22 can be for one or more particular control panel 21, and other buttons outside of that control panel 21 may not be deactivated at step 122.

The plurality of control buttons 22 should be placed in the disabled or second state before or while the occupant is instructed to press a control button 22. Thus, in an embodiment, step 118 can be performed simultaneously with steps 120 and 122. Alternatively, steps 120 and/or 122 can be performed before step 118 so that the plurality of control buttons 22 are disabled or placed in the second state prior to the occupant being instructed to press a control button 22. In an embodiment, the method 100 can omit step 118. In an embodiment, the controller 16 can cause another indication besides the third audible response to indicate that the control buttons 22 have been placed in the disabled or second state and are thus safe to be pressed by the occupant without causing an adjustment. For example, the controller can cause one or more light to change to indicate the change in state of the plurality of control buttons 22.

At step 124, the occupant actuates a control button 22 of the plurality of control buttons 22. In an embodiment, the control button 22 actuated by the occupant is the control button 22 that the user has inquired about with the audible command at step 102 (e.g., by asking "What does this button do?"). The control button 22 can be actuated, for example, by mechanically moving the control button 22, by touching the control button 22 on a touch screen, or by other methods.

At step 126, the controller 16 performs signal analysis relating to the actuated control button 22. Specifically, the controller 16 performs signal analysis to determine which control button 22 of the plurality of control buttons 22 has been actuated by the occupant at step 124. In an embodiment, the system 10 includes one or more sensor configured to determine which control button 22 has been pressed by the occupant, and the controller 16 performs signal analysis using feedback from the one or more sensor. In an embodiment, the controller 16 performs the same type of signal analysis which would be used to determine actuation of a control button 22 if the control buttons 22 were in the active or first state.

In an embodiment, the controller 16 is programmed to automatically place the control button 22 back in the first state after the occupant actuates the control button 22 at step 124 and/or the signal analysis is performed at step 126. In this embodiment, the actuation of additional control buttons 22 besides the control button 22 which the occupant seeks to learn about will then cause the adjustment of at least one adjustable vehicle component 20 corresponding to that additional control button 22.

At step 128, the controller 16 acquires feedback regarding the control button 22 identified by the signal analysis. In an embodiment, the controller 16 acquires feedback from the memory 19. In an embodiment, the controller 16 acquires feedback to determine the name and/or function of the control button 22. The name can be the name of an adjustable vehicle component 20 or group of adjustable components 20, the name of a mode corresponding to the adjustable vehicle component 20 or group of adjustable components, or another name associated with the adjustment caused by the control button 20. In an embodiment, the controller 16 acquires feedback to determine the current configuration or state of the control button 22. In an embodiment, the controller 16 acquires at least one message relating to the control button 22. In an embodiment, the at least one message is acquired from the memory 19. In another embodiment, the at least one message can be acquired from a location outside of the vehicle 12 via wireless communication.

In an embodiment, the memory 19 stores a database of names and/or functions related to each of the plurality of control buttons 22. In an embodiment, the memory 19 stores a database of a plurality of messages. In an embodiment, the database includes at least one message corresponding to each of the plurality of control buttons 22. The at least one message can include a first message and a second message, with the second message different from the first message. In an embodiment, the first message refers to the at least one adjustable vehicle component 20 configured to be adjusted by the control button 22 (e.g., by name, mode, etc.), and the second message provides a functionality of the at least one adjustable vehicle component 20 configured to be adjusted by the control button 22. In an embodiment, the at least one message informs the occupant what the control button 22 is called (e.g., by name, mode, etc.), which can be useful for example to help the occupant learn voice commands for future voice activation of the control button 22 without actuating the control button 22. In an embodiment, the at least one message informs the occupant of words to use so that thereafter the control button 22 can be activated by an audible command into the audio device 24.

In the illustrated embodiment, the memory 19 stores a database of a plurality of audible messages. The audible messages can be output by the audio device 24. The database includes at least one audible message corresponding to each of the plurality of control buttons 22. The at least one audible message can include a first audible message and a second audible message, with the second audible message different from the first audible message. In an embodiment, the first audible message refers to the at least one adjustable vehicle component 20 configured to be adjusted by the control button 22 (e.g., "This is the defroster" corresponding to the defrost button, or "This is the sport mode" corresponding to the sport mode button), and the second audible message provides a functionality of the at least one adjustable vehicle component 20 configured to be adjusted by the control button 22 (e.g., "The defroster is used to remove water formation on the windshield or rear window, an occurrence typical to when the outside temperature is low and the AC is off" or "The sport mode changes the acceleration and breaking profile of this car, for a more race car like feel."). In an embodiment, the at least one audible message informs the occupant what the control button 22 is called (e.g., by name, mode, etc.), which can be useful for example to help the occupant learn voice commands for future voice activation of the control button 22 without actuating the control button 22. In an embodiment, the at least one audible message informs the occupant of words to use so that the control button 22 can thereafter be activated by an audible command into the audio device 24.

In an embodiment, at step 128 the controller 16 acquires feedback regarding the current configuration or state of the at least one vehicle component 20 corresponding to the actuated control button 22. For example, if the actuated control button 22 corresponds to the defroster, the state of the defroster can be ON or OFF. In another example, the state of the control button 22 can be a setting (e.g., low, medium or high).

At step 130, the controller 16 determines at least one message relating to the actuated control button 22 to be output to the user. The message can be an audio message as discussed herein. In an alternative embodiment, the message can be output to the occupant in other ways (e.g., via a user interface screen). In an embodiment, the controller 16 generates the at least one message. In an embodiment, the controller 16 generates the at least one message by converting data retrieved from the memory 19 into at least one audible message to be output by the audio device 24. For example, the controller 16 is configured to retrieve data regarding the name of the at least one adjustable vehicle component 20 at step 128 (e.g., the defroster) and generate at least one messages related to the adjustable vehicle component 20 (e.g., "This is the defroster"). In another example, the controller 16 is configured to retrieve data regarding the functionality of the at least one adjustable vehicle component 20 at step 128 (e.g., the defroster) and generate at least one messages related to the functionality of the adjustable vehicle component 20 (e.g., "The defroster is used to remove water formation on the windshield or rear window, an occurrence typical to when the outside temperature is low and the AC is off."). In another example, the controller 16 is configured to retrieve data regarding the configuration/state of the at least one adjustable vehicle component 20 at step 128 (e.g., the defroster) and generate at least one message related to the configuration/state of the vehicle component 20 (e.g., "This is the defroster. It is currently turned off" or "This is the defroster. It is currently turned on the low setting.").

At step 132, the controller 16 causes the output of at least one message relating to the at least one adjustable vehicle component 20 configured to be adjusted by the actuated control button 22. In an embodiment, the at least one message includes a first message and a second message. In an embodiment, the first message refers to the at least one adjustable vehicle component 20 configured to be adjusted by the actuated control button 22 (e.g., the first message: "This is the defroster"). In an embodiment, the second message provides a functionality of the at least one adjustable vehicle component 20 configured to be adjusted by the actuated control button 22 (e.g., the second message: "The defroster is used to remove water formation on the windshield or rear window, an occurrence typical to when the outside temperature is low and the AC is off.").

In an embodiment, the controller 16 is programmed to cause the audio device 24 to output the first audible message upon actuation of the control button 22 at step 124, and to output the second audible message upon subsequent reception of a second trigger. In an embodiment, the second trigger includes a second actuation of the control button 22. Thus, in this embodiment, the controller 16 causes output of the first audible message upon a first actuation of a control button 22 at step 124 after the plurality of control buttons 22 have been placed in the disabled or second state, and causes output of the second audible message upon a second actuation of the control button 22 after the plurality of control buttons 22 have been placed in the disabled or second state. In another embodiment, the second trigger includes a second audible trigger received by the audio device 24. Thus, in this embodiment, the controller 16 causes output of the first audible message (e.g., "This is the defroster") upon a first actuation of a control button 22 at step 124 after the plurality of control buttons 22 have been placed in the disabled or second state, and causes output of the second audible message upon an additional audible command received by the audio device 24 in response to the first audible message (e.g., the occupant saying "What does the defroster do?" after receiving the first audible message). The additional audible command can be processed in the same way as the initial audible command (e.g., with outputs/thresholds as described herein).

In an embodiment, the controller 16 is programmed to automatically place the plurality of control buttons 22 back in the first state upon causing the output of the at least one message relating to the at least one adjustable vehicle component 20 corresponding to the actuated control button 22. For example, the controller 16 is programmed to place the plurality of control buttons 22 back in the active or first state upon causing output of the first message and/or the second message. Then, when the control button 22 is pressed again, the controller 16 is programmed to cause the adjustment of the at least one adjustable vehicle component 20 corresponding to the actuated control button 22.

In an embodiment, after causing the at least one message to be output to the occupant, the controller 16 is programmed to cause the adjustment of the at least one adjustable vehicle component 20 corresponding to the actuated control button 22 upon reception of a second trigger. In an embodiment, the second trigger includes a second actuation of the control button 22. Thus, in this embodiment, the controller 16 causes output of at least one message upon a first actuation of a control button 22 at step 124 after the plurality of control buttons 22 have been placed in the disabled or second state, and causes the adjustment of the at least one adjustable vehicle component 20 corresponding to the actuated control button 22 upon a second actuation of the control button 22. In another embodiment, the second trigger includes an audible trigger received from the occupant. Thus, in this embodiment, the controller 16 causes output of at least one message (e.g., "This is the defroster") upon actuation of a control button 22 at step 124 after the plurality of control buttons 22 have been placed in the disabled or second state, and causes the adjustment of the at least one adjustable vehicle component 20 corresponding to the actuated control button 22 upon an additional audible command received by the audio device 24 in response to the at least one message (e.g., the occupant saying "Please enable the defroster."). The additional audible command can be processed in the same way as the initial audible command (e.g., with outputs/thresholds as described herein).

Figure 3:
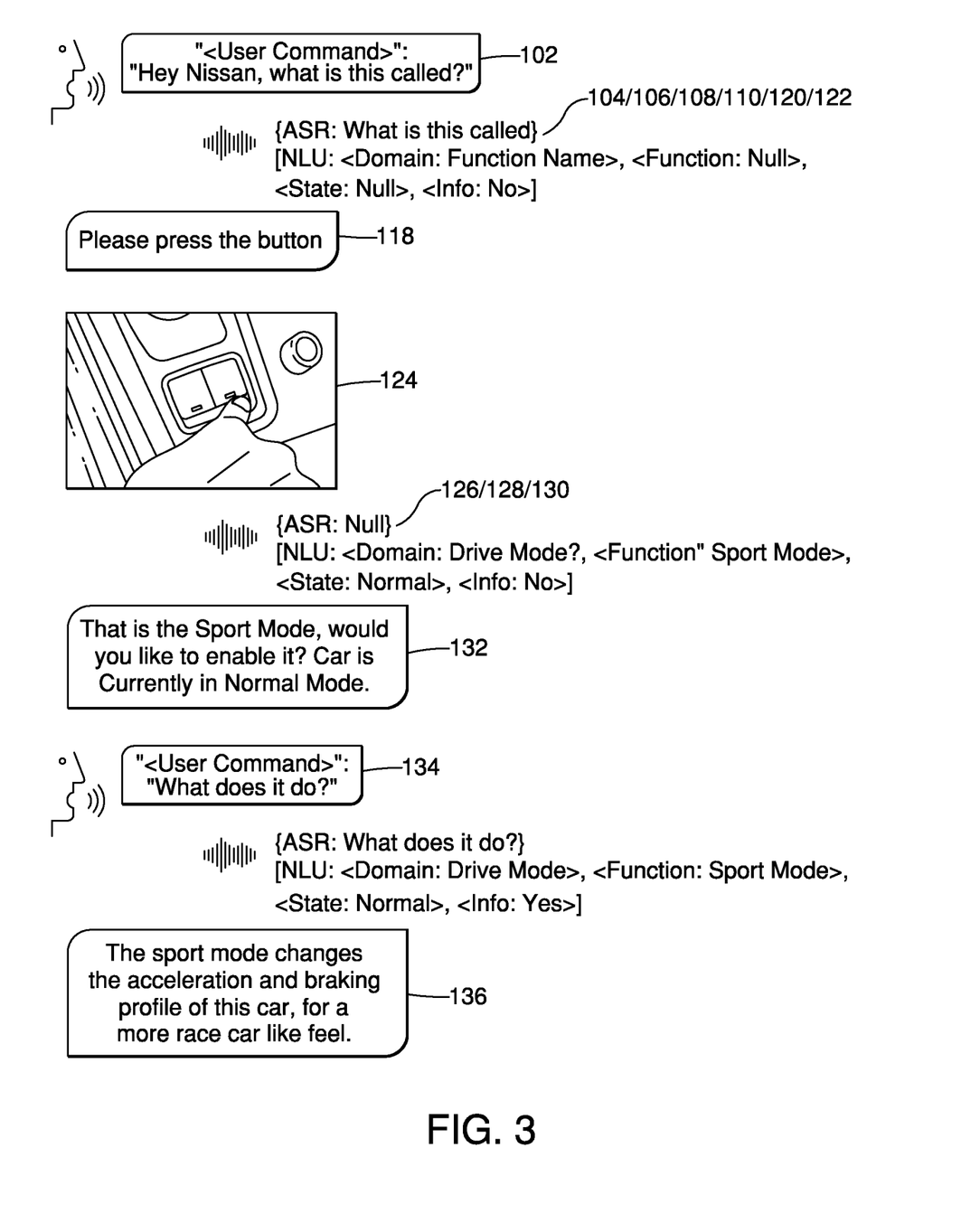
FIG. 3 illustrates an example embodiment of the method of FIG. 2.

FIG. 3 illustrates an example embodiment of the method 100. In FIG. 3, the audible command received by the audio device 24 at step 102 is "Hey Nissan, what is this called?". The audible command includes an audible trigger which can include, for example, the full phrase (e.g., "Hey Nissan, what is this called?") or a portion of the phrase (e.g., "what is this called" or "this called" or "called"). The controller 16 then processes command data from the audible command according to steps 104, 106, 108 and 110 of the method 100.

At step 106, the first output (e.g., the ASR output) meets the first threshold. At step 110, the second output (e.g., the NLU output) meets the second threshold. The audible trigger has therefore been confirmed. At step 118, the controller 16 causes the third audible response (e.g., "Please press the button," while also performing steps 120 and 122 to place the plurality of control buttons 22 in the disabled or second state. The occupant then presses a control button 22 at step 124 (here, the control button 22 corresponding to the sport mode). The controller 16 then performs steps 126, 128 and 130 to determine that the sport mode button has been pressed and generates a first audible message to be output to the user at step 132. Here, the first audible message output at step 132 is "That is the Sport Mode, would you like to enable it? Car is currently in Normal Mode." This audible message includes both the name of at least one adjustable vehicle component 20 (e.g., "Sport Mode", the name of the mode corresponding to the adjustable vehicle component 20) and the configuration/state (e.g., "Normal Mode"; e.g., Sport Mode is turned off).

FIG. 3 illustrates additional steps 134 and 136 which demonstrate reception of one or more second trigger. Here, the controller 16 is programmed to receive one of a plurality of second triggers. At step 132, the first audible message is "That is the Sport Mode, would you like to enable it? Car is currently in Normal Mode." At this point, the occupant can cause a second trigger by saying "Yes", at which point the controller 16 will cause the adjustment of the at least one adjustable vehicle component 20 (e.g., enable sport mode) upon reception of the second trigger (e.g., the audible second trigger "Yes" to the question of enabling the sport mode). However, in the illustrated embodiment, the occupant provides a different second trigger. At step 134, the occupant provides a second audible trigger in the form of "What does it do?". The controller 16 recognizes this as a different second audible trigger and thus causes the second audible message to be output to the occupant. Here, the second audible message is "The sport mode changes the acceleration and breaking profile of this car, for a more race car like feel." Thus, in the embodiment of FIG. 3, the at least one message includes both a first audible message and a second audible message. The first audible message refers to the at least one adjustable vehicle component 20 configured to be adjusted by the actuated control button 22 (e.g., "That is the Sport Mode"), and the second audible message provides a functionality of the at least one adjustable vehicle component 20 configured to be adjusted by the actuated control button 22 (e.g., "The sport mode changes the acceleration and breaking profile of this car, for a more race car like feel.").

The systems and methods described herein are advantageous for teaching control button functionality to an occupant of a vehicle 12. The systems and methods described herein can teach the occupant both the vehicle component(s) that a button relates to and how the vehicle component(s) functions. By providing this information via actuation of the button itself, there is no confusion as to the information desired by the vehicle occupant. It should be understood that various changes and modifications to the methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle 12 equipped as disclosed herein. Accordingly, these terms, as utilized to describe the present invention should be interpreted relative to a vehicle 12 equipped as shown herein.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for teaching control button functionality to an occupant of a vehicle, the system comprising:
   a plurality of adjustable vehicle components;
   an audio device configured to receive an audible first trigger and a plurality of alternative audible second triggers from the occupant;
   a plurality of control buttons each configured to cause an adjustment of at least one adjustable vehicle component of the plurality of adjustable vehicle components when actuated by the occupant; and
   a controller programmed to (i) determine whether the audible first trigger received by the audio device meets a first threshold and a second threshold; (ii) cause a first response, requesting that the audible first trigger be repeated, to be output from the audio device upon determining that the audible first trigger does not meet the first threshold; (iii) cause a second response, requesting that the audible first trigger be rephrased, to be output from the audio device upon determining that the audible first trigger does not meet the second threshold; (iv) upon receipt of the audible first trigger from the occupant and upon determining that the audible first trigger meets the first threshold and the second threshold, disable the plurality of control buttons and cause a third response requesting that the occupant press a control button of the plurality of control buttons, (v) upon detecting actuation of the control button by the occupant after disabling the plurality of control buttons, cause the audio device to output a first audible message that provides a name of the at least one adjustable vehicle component corresponding to the control button, which is used for future voice activation of the at least one adjustable vehicle component via the audio device without pressing the control button, and a current configuration of the at least one adjustable vehicle component configured to be adjusted by the control button, (vi) upon output of the first audible message, request the occupant to provide one of a plurality of alternative audible second triggers, (vii) upon reception of one alternative audible second trigger, cause output of a second audible message providing a functionality of the at least one adjustable vehicle component corresponding to the control button, the second audible message different from the first audible message, and (viii) upon reception of a different alternative audible second trigger, cause the adjustment to the at least one adjustable vehicle component corresponding to the control button.

2. The system of claim 1, comprising
a memory storing a database of a plurality of audible messages, the database including at least one audible message corresponding to each of the plurality of control buttons.

3. The system of claim 1, wherein
the controller is programmed to automatically enable the plurality of control buttons to cause the adjustment of the at least one adjustable vehicle component of the plurality of adjustable vehicle components when actuated by the occupant upon causing the output of the second audible message.

4. The system of claim 1, comprising
a memory storing a database of a plurality of audible messages including the first audible message and the second audible message.

5. The system of claim 1, wherein
the plurality of control buttons is a subset of a total number of control buttons in the vehicle.

6. The system of claim 1, wherein
the audible first trigger includes a trigger word or phrase.

7. The system of claim 1, wherein
the audible first trigger meets the first threshold when an automatic speech recognition output for the audible first trigger meets a first confidence score, and
the audible first trigger meets the second threshold when a natural language understanding output for the audible first trigger meets a second confidence score.

8. A system for teaching control button functionality to an occupant of a vehicle, the system comprising:
a plurality of adjustable vehicle components;
an audio device configured to receive voice activation commands from the occupant;
a plurality of control buttons each configured to be placed in at least (i) a first state in which actuation by the occupant causes an adjustment of at least one adjustable vehicle component of the plurality of adjustable vehicle components, and (ii) a second state in which actuation by the occupant causes at least one message relating to the at least one adjustable vehicle component to be output to the occupant; and
a controller programmed to
(i) upon receipt of an audible first trigger by the audio device from the occupant, (a) determine whether the audible first trigger received by the audio device meets a first threshold and a second threshold, (b) cause a first response, requesting that the audible first trigger be repeated, to be output from the audio device upon determining that the audible first trigger does not meet the first threshold, and (c) cause a second response, requesting that the audible first trigger be rephrased, to be output from the audio device upon determining that the audible first trigger does not meet the second threshold,
(ii) upon determining that the audible first trigger meets the first threshold and the second threshold, disable the plurality of control buttons by placing the control buttons in the second state and request that the occupant press a control button of the plurality of control buttons,
(iii) upon detection of the occupant pressing the control button, cause output of a first message including a name of the at least one adjustable vehicle component corresponding to the control button, which is used for future voice activation of the at least one adjustable vehicle component via the audio device without pressing the control button, and a current configuration of the at least one adjustable vehicle component,
(iv) upon output of the first message, request the occupant to provide one of a plurality of alternative audible second triggers,
(v) upon reception of one alternative audible second trigger of the plurality of alternative audible second triggers, cause output of a second message providing a functionality of the at least one adjustable vehicle component corresponding to the control button, the second message different from the first message, and
(vi) upon reception of a different alternative audible second trigger of the plurality of alternative audible second triggers, cause the adjustment to the at least one adjustable vehicle component corresponding to the control button.

9. The system of claim 8, wherein
the controller is programmed to automatically place the control button in the first state upon causing the output of the second message.

10. The system of claim 8,
the controller is programmed to cause one or more light to change to indicate a change between the first state and the second state.

11. The system of claim 8, comprising
a memory storing a database of a plurality of audible messages including the first message and the second message.

12. The system of claim 8, comprising
a memory storing a database of a plurality of audible messages, the database including at least one audible message corresponding to each of the plurality of control buttons.

13. The system of claim 8, wherein
the plurality of control buttons is a subset of a total number of control buttons in the vehicle.

14. The system of claim 8, comprising
the audible first trigger includes a trigger word or phrase.

15. A method of teaching control button functionality to vehicle occupants, the method comprising:
receiving an audible first trigger from an occupant of a vehicle having a plurality of control buttons each configured to cause an adjustment of at least one adjustable vehicle component upon actuation by the occupant;
upon receipt of the audible first trigger from the occupant, determining that the audible first trigger does or does not meet a first threshold and a second threshold, and upon such determination
causing a first response, requesting that the audible first trigger be repeated, to be output when it is determined that the audible first trigger does not meet the first threshold,
causing a second response, requesting that the audible first trigger be rephrased, to be output when it is determined that the audible first trigger does not meet the second threshold, and
when it is determined that the audible first trigger meets the first threshold and the second threshold, (i) disabling the plurality of control buttons so that actuation of a control button of the plurality of control buttons causes an output of at least one message relating to the at least one adjustable vehicle component corresponding to the control button instead of causing the adjustment of the at least one adjustable vehicle component, and (ii) requesting that the occupant press a control button of the plurality of control buttons;
detecting the occupant pressing the control button, and upon detection of the occupant pressing the control button, causing output of a first message including (i) a name of the at least one adjustable vehicle component corresponding to the control button, which is used for future voice activation of the at least one adjustable vehicle component via an audio device without pressing the control button, and (ii) a current configuration of the at least one adjustable vehicle component; and
upon output of the first message, requesting the occupant to provide one of a plurality of alternative audible second triggers;
receiving one alternative audible second trigger of the plurality of audible second triggers, and upon reception of the one alternative audible second trigger of the plurality of alternative audible second triggers, causing output of a second message providing a functionality of the at least one adjustable vehicle component corresponding to the control button to be output to the occupant, the second message different from the first message; and
receiving a different alternative audible second trigger of the plurality of audible second triggers, and upon reception of the different alternative audible second trigger of the plurality of alternative audible second triggers, causing the adjustment to the at least one adjustable vehicle component corresponding to the control button.

16. The method of claim 15, wherein
causing the first and second messages includes retrieving the first and second messages from a database including first and second messages corresponding to each control button of the plurality of control buttons.

17. The method of claim 15, comprising
upon causing the output of the second message, automatically placing the plurality of control buttons in a state such that actuation of the control button causes the adjustment of the at least one adjustable vehicle component.

18. The method of claim 15, comprising
storing a database of a plurality of audible messages including the first message and the second message.

19. The method of claim 15, comprising causing one or more light to change to indicate the state of the plurality of control buttons.

20. The method of claim 15, wherein the plurality of control buttons is a subset of a total number of control buttons in the vehicle.

* * * * *